United States Patent [19]

Koene

[11] 4,447,114
[45] May 8, 1984

[54] OPTICAL SLIP RINGS

[75] Inventor: Johan W. Koene, Borne, Netherlands

[73] Assignee: Hollandse Signaalapparaten B.V., Hengelo, Netherlands

[21] Appl. No.: 233,610

[22] PCT Filed: May 16, 1980

[86] PCT No.: PCT/NL80/00018
§ 371 Date: Jan. 31, 1981
§ 102(e) Date: Jan. 23, 1981

[87] PCT Pub. No.: WO80/02750
PCT Pub. Date: Dec. 11, 1980

[30] Foreign Application Priority Data

May 31, 1979 [NL] Netherlands ................ 7904279

[51] Int. Cl.³ .................................... C02B 7/26

[52] U.S. Cl. .................................. 350/96.2; 350/96.18
[58] Field of Search ............................ 350/96.2, 96.18

[56] References Cited

U.S. PATENT DOCUMENTS 4,258,976 3/1981 Scott et al. .................. 350/96.2

Primary Examiner—Eli Lieberman
Attorney, Agent, or Firm—Robert J. Kraus

[57] ABSTRACT

An optical coupling body is disposed between first and second arrays of optical conductors mounted for rotation at equal but opposite rates relative to the body. Either light reflective or light transmissive means is arranged in the body to effect constant coupling of individual conductors in the first array with respective conductors in the second array.

6 Claims, 11 Drawing Figures

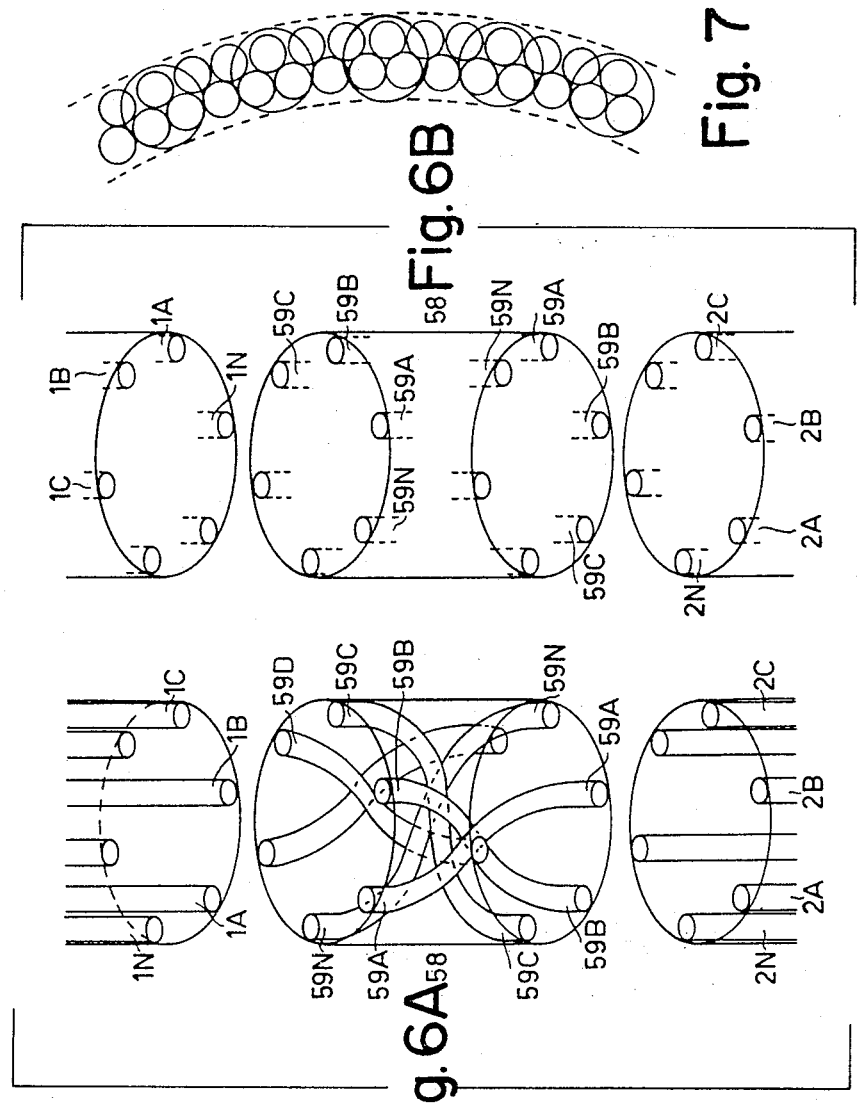

OPTICAL SLIP RINGS

BACKGROUND OF THE INVENTION

The invention relates to a rotary optical coupler between a first array of optical conductors and a second identical array of optical conductors, which optical coupler comprises an optical body for a mirror-symmetric transfer of radiation between the two arrays of optical conductors, said optical body being further capable of rotating about the rotation axis of the optical coupler at the same angular velocity but in opposite direction with respect to the two arrays of optical conductors. An optical conductor is here understood to be in particular an optical fibre guide.

The rotary optical coupler is utilised for the transfer of digital data between mutually rotatable units, and is known from the U.S. Pat. No. 4,027,945. In this patent the optical body consists of a prism, preferably a Dove prism or a Péchan prism. The application of a Dove prism has however the disadvantage that, due to the reflection of the light at each of the two end faces, the path of the individual light rays is frequency-dependent. Consequently, in view of the fixed arrays of the optical conductors, the light intensity of the radiation transferred is frequency-dependent. The application of a Péchan prism on the other hand has the disadvantage that, due to a five-fold reflection of the incident light and the associated long path length, the intensity of the light transferred is reduced. Also, because of the large ratio between the optical path length within the prism and the width of the prism, the optical conductors have to be aligned very accurately, or the permitted number of optical conductors will be limited. Further, in both cases it is desirable to dispose the end members of the individual optical conductors at some distance from each other to avoid crosstalk between the various conductors. Other types of prisms have similar disadvantages.

SUMMARY OF THE INVENTION

It is an object of the invention to obviate the above disadvantages.

According to the invention, the optical body of a rotary optical coupler of the type set forth in the opening paragraph provides for a refractionless passage of the supplied radiation by means of a single collective image transformation. In this way the disadvantages due to the frequency-dependent refraction and multiple reflections is obviated.

BRIEF DESCRIPTION OF THE DRAWING

The present invention will now be described with reference to five embodiments of a rotary optical coupler schematically illustrated in the accompanying figures, in which:

FIGS. 6A and 6B are a fifth embodiment of a rotary optical coupler;

FIG. 7 is a part of the fifth embodiment of a rotary optical coupler;

FIG. 8 is a cross section of a bundle of optical conductors; and

DESCRIPTION OF THE PREFERRED EMBODIMENTS

In the embodiments described below an optical fibre guide is used as conductor. Moreover, the more appropriate term "optical slip rings" will be used as much as possible, instead of "rotary optical coupler". Instead of fibre optical conductors, opto-electric conductors, known from the cited U.S. patent, can be applied.

Figure 1:
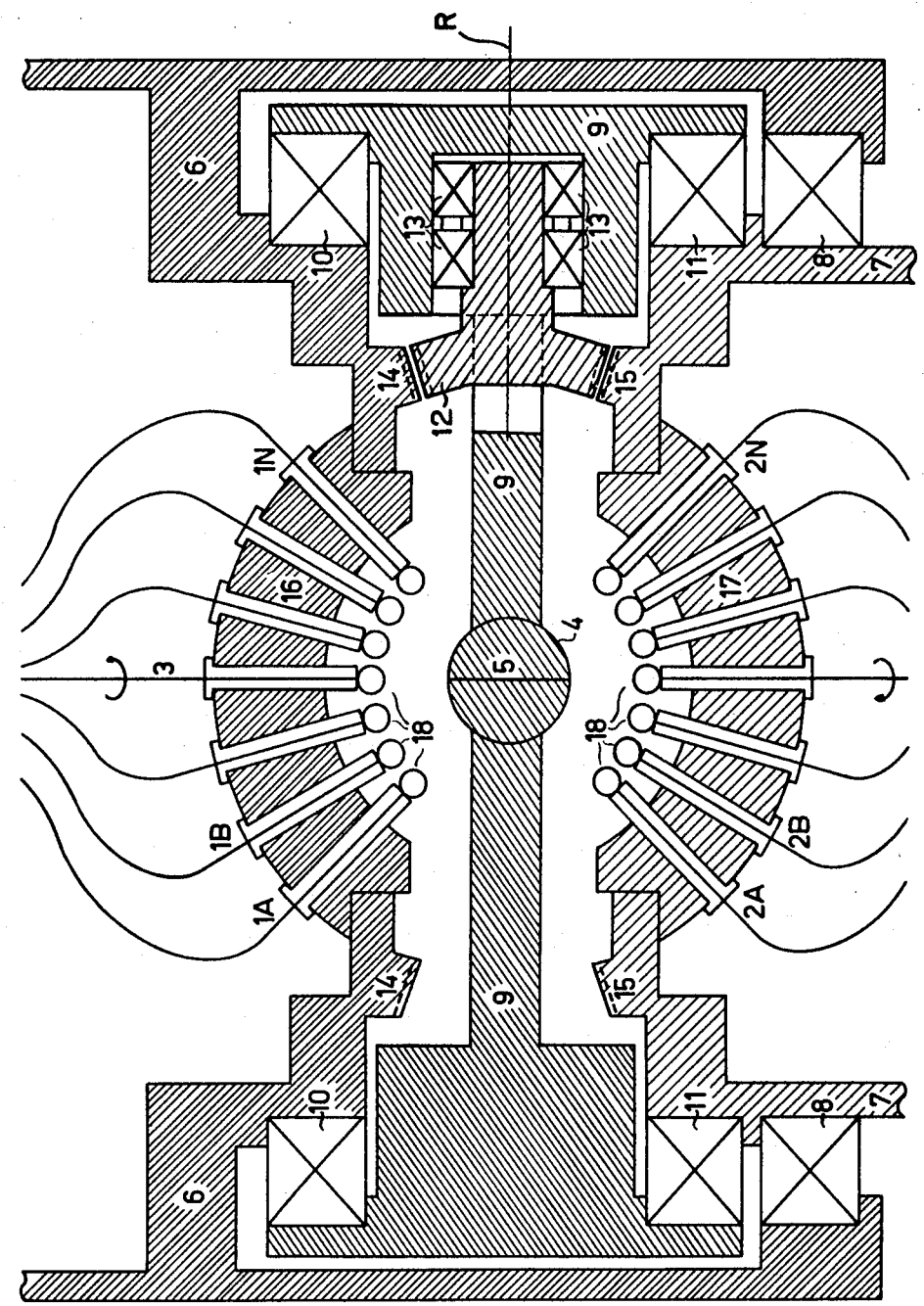
FIG. 1 is a first embodiment of a rotary optical coupler.

FIG. 1 is a first embodiment of optical slip rings for two arrays of optical conductors 1A–1N and 2A–2N, where the optical conductors of one array are rotatable as one whole about an axis 3 with respect to the other array of optical conductors. The optical slip rings also comprise an optical body 4 for transmitting light from an optical conductor $1i$ of the first array, where $i=A, \ldots, N$, to a correspondingly indexed optical conductor $2i$ of the second array. In this embodiment the optical body 4 is a spherical transparent body consisting of two hemispheres, separated by a thin circular reflector 5 having two light-reflecting sides. Optical body 4 is mounted in such a way that the rotation axis 3 of the optical slip rings lies in the plane of reflector 5 and passes through the centre of this reflector. Optical body 4 is also capable of rotating about axis 3. The motional system of the arrays of optical conductors 1A–N and 2A–N and optical body 4 is such that the two arrays will rotate at the same angular velocity relative to optical body 4 but in opposite directions. For instance, with an angular velocity $\omega$ of the first array of optical conductors 1A–N with respect to the second array of optical conductors 2A–N, the first array will rotate at an angular velocity of $+\frac{1}{2}\omega$ and the second array at an angular velocity of $-\frac{1}{2}\omega$ with respect to optical body 4. For the two arrays of optical conductors, the ends of the optical conductors are directed to the centre of the spherical body 4. Furthermore, the two arrays of optical conductors are so arranged that they form a mirror image of each other. Thus a light beam from optical conductor $1i$ of the first array will be transmitted to the correspondingly indexed optical conductor $2i$ of the other array via reflector 5 of spherical body 4, even when the optical slip ring components perform the abovementioned rotational motions.

The optical slip rings are mounted between the first and the second tube members 6 and 7, which members are mutually rotatable in bearing blocks 8. The optical slip rings include a supporting disc 9, for supporting the optical body 4. At both sides of this disc are flanged edge parts, which rotate in bearing blocks 10 and 11 secured to the first and the second tube members 6 and 7, respectively. The supporting disc 9 has mounted therein a conical gear 12 rotatable in bearing block 13 about a radial axis of rotation R. Conical gear 12 engages the first and the second tube members 6 and 7 through conical gears 14 and 15, respectively, which are mounted in the tube members and are active in the radial plane. Conical gears 14 and 15 each contain a central recess, in which holders 16 and 17 are mounted to accommodate the ends of optical conductors 1A–N and 2A–N, respectively. The ends of the optical conductors are further fitted with elements 18 for reducing the apertures for the light beams. These elements preferably consist of lenses.

Figure 9:
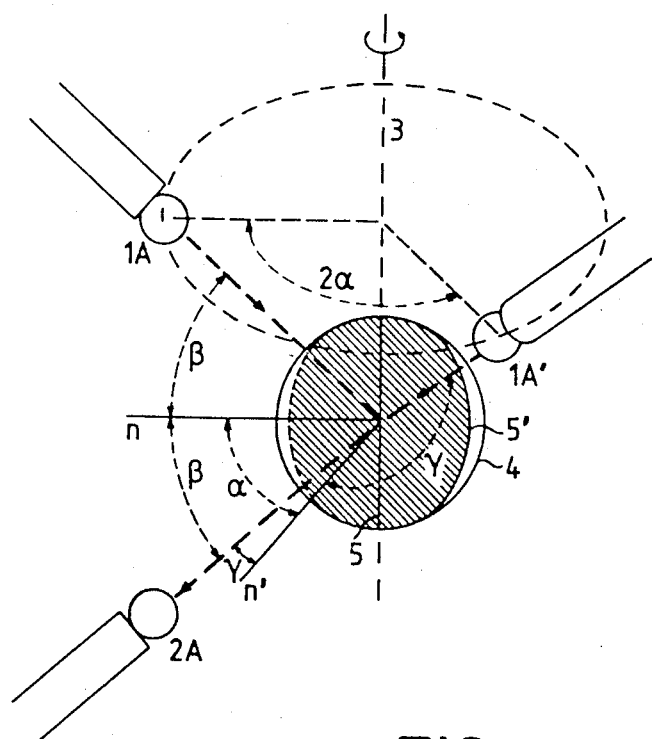
FIG. 9 is an explanatory view.

FIG. 9 illustrates the continued transmission of a light ray from optical conductor 1A to optical conductor 2A as array 16, spherical body 4 and array 17 rotate about axis 3 relative to each other. In a first position, a light ray for optical conductor 1A is reflected by the reflector 5 in body 4. In this position of the reflector 5 is normal to the plane of the drawing sheet. The angle of incidence of the light ray from the optical conductor 1A and the angle of reflection of the light ray reflected to optical conductor 2A are indicated by $\beta$. When the optical conductor 1A is rotated through an angle $2\alpha$ to the position indicated by 1A', the optical body 4 and the reflector (new position 5') are rotated through an angle $\alpha$, as is shown by the movement of a radial axis of body 4, perpendicular to reflector 5, from position n to position n'. In this new position the angles of incidence and reflection are indicated by $\gamma$.

Figure 2:
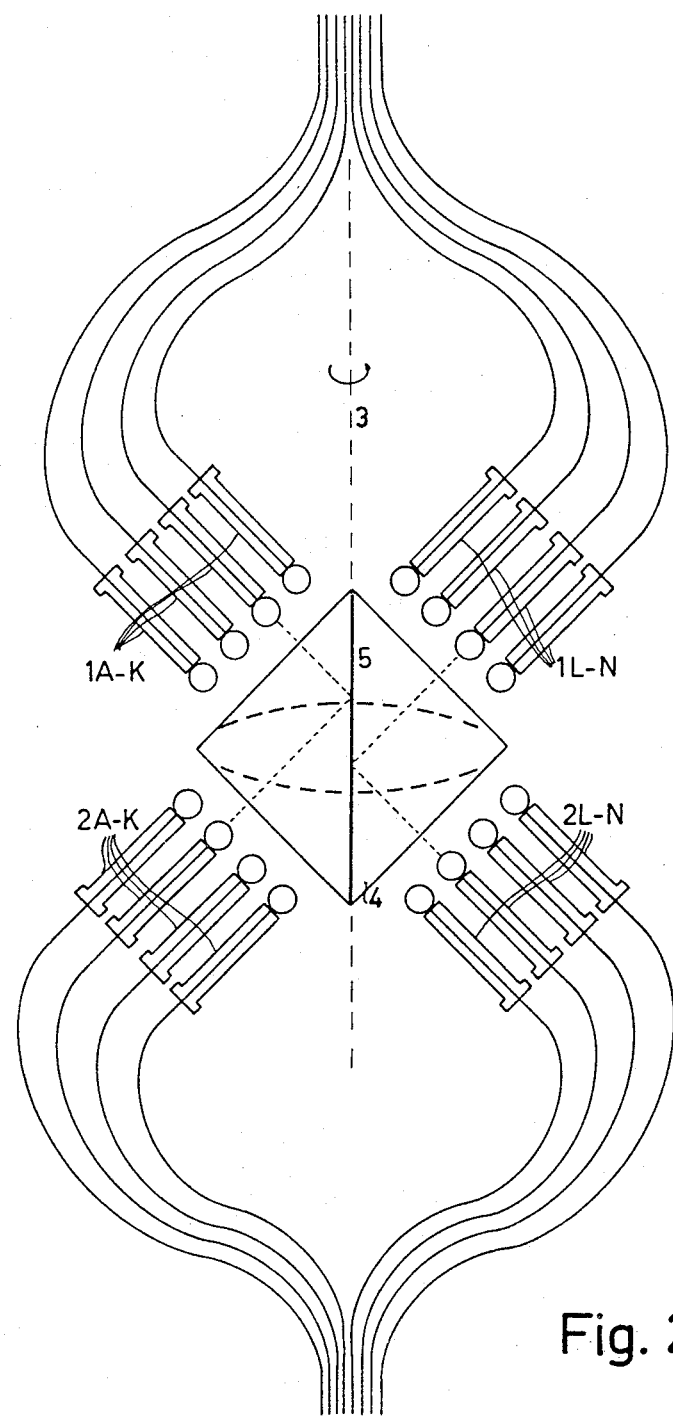
FIG. 2 is a second embodiment of a rotary optical coupler.

The design of optical body 4 shown in FIG. 1 need not be limited to a spherical shape. It is also possible, as illustrated in FIG. 2, to design the optical body 4 as a combination of two interconnected conical elements having equal vertical angles. In this embodiment, reflector 5 having two reflective sides passes through axis 3 of optical body 4. Each optical conductor should be so arranged that it is normal to the generating line of the conical surface of revolution in the plane of axis 3 and the optical conductor concerned and is directed toward rotation axis 3.

Figure 3:
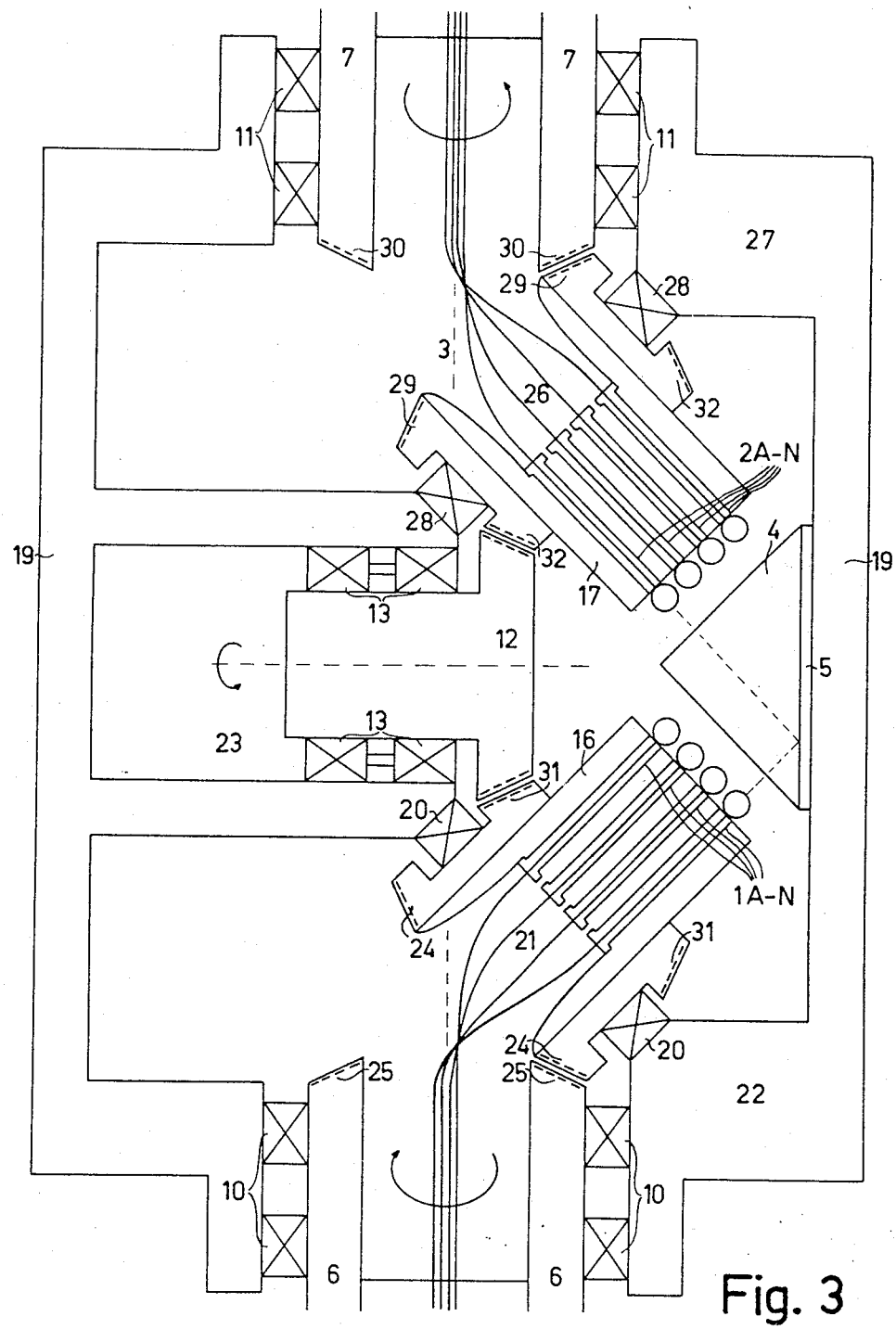
FIG. 3 is a third embodiment of a rotary optical coupler.

FIG. 3 illustrates a third embodiment of optical slip rings. In this embodiment of optical slip rings are accommodated in a housing 19, which is rotatable in bearing blocks 10 and 11 between the first and the second tube members 6 and 7. Optical body 4, comprising a reflector 5 having one reflective side in this embodiment, is mounted at a certain distance from and parallel to the rotation axis 3 and is fixed against the inner wall of housing 19. Here, the motional system of the arrays of optical conductors 1A-N, 2A-N and optical body 4 is such that the two arrays rotate at the same angular speed but in opposite direction relative to optical body 4. During operation of the optical slip rings, the two arrays of optical conductors must be kept directed to reflector 5, and thus each of these arrays performs a motion of precession with respect to rotation axis 3. Bearing blocks 20 are provided in a first cylindrical chamber 21 between bottom plate 22 of housing 19 and the lower end of a second cylindrical chamber 23 of housing 19. These bearing blocks enable holder 16, which supports the optical conductors 1A-N to rotate about an axis inclined with respect to reflector 5 of the optical body and intersecting this reflector at the centre. Holder 16 includes a conical gear 24 which meshes with a correspondingly dimensioned conical gear 25 secured to the end of the first tube member 6.

As to the second array of optical conductors 2A-N, the means for enabling rotation are identical to those for the first array. Housing 19 contains a third cylindrical chamber 26 fitted between the top plate 27 of housing 19 and the upper end of the second cylindrical chamber 23. Holder 17, supporting the second array of optical conductors 2A-N, is rotatable inside chamber 26 in bearing blocks 28. Holder 17 comprises a conical gear 29, which meshes with a correspondingly dimensioned conical gear 30 at the end of second tube member 7. Holders 16 and 17 are so arranged that they form the mirror image of each other. To obtain a correlated functioning of the two arrays of optical conductors 1A-N and 2A-N with respect to the light transmission, housing 19 comprises a conical gear 12 which is rotatable inside a chamber 23 about an axis normal to the centre of reflector 5. This is effected by a boss mounted to conical gear 12, which is rotatable inside chamber 23 in bearing blocks 13. Conical gear 12 meshes with holder 16 through a conical gear 31 fitted around this holder and with holder 17 through a conical gear 32 fitted around holder 17.

Figure 4:
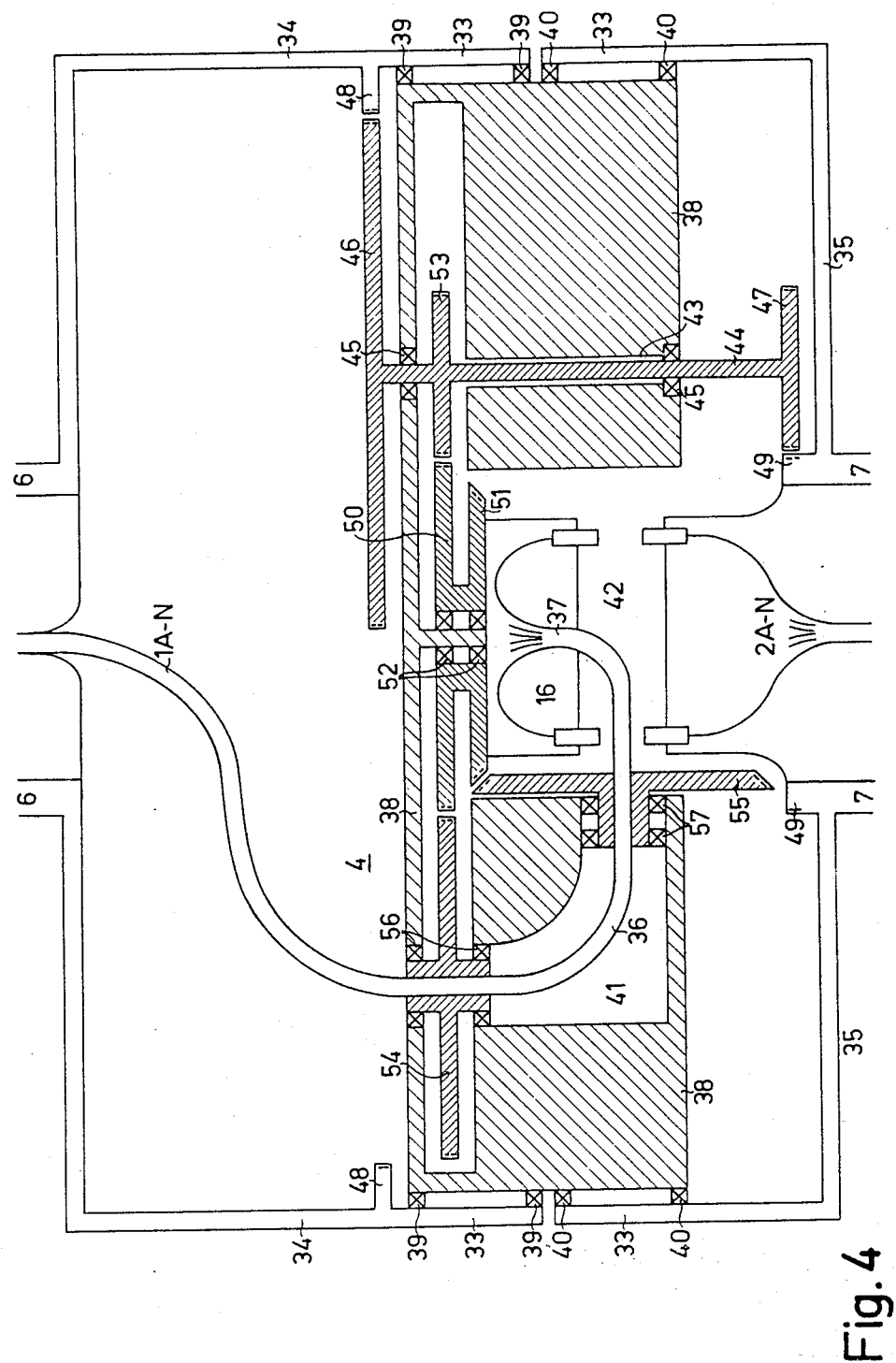
FIG. 4 is a fourth embodiment of a rotary optical coupler.

FIG. 4 illustrates a fourth embodiment of a rotary optical coupler, accommodated fully within a cylindrical enclosure 33, which is divided into two halves 34 and 35, each half being connected with the adjoining tube members 6 and 7, respectively. Optical body 4, being part of the first array of optical conductors 1A-N, is constituted by a loop 36 bent in the shape of a hook, while end 37 of the loop turned inwards faces the first array of optical conductors 1A-N. End 37 has a fixed orientation with respect to the second array of optical conductors, and retains this orientation even when the first array of optical conductors is rotating.

A collective rotation of the first array of optical conductors 1A-N at an angular velocity $\omega$ with respect to the second array of optical conductors 2A-N is to be combined with a swivelling motion of the bent-loop 36 at half the angular speed ($\frac{1}{2}\omega$). Only under these conditions it is assured that the loop 36 will not get twisted, as will be explained with reference to FIGS. 5A and 5B.

Figures 5A, 5B:
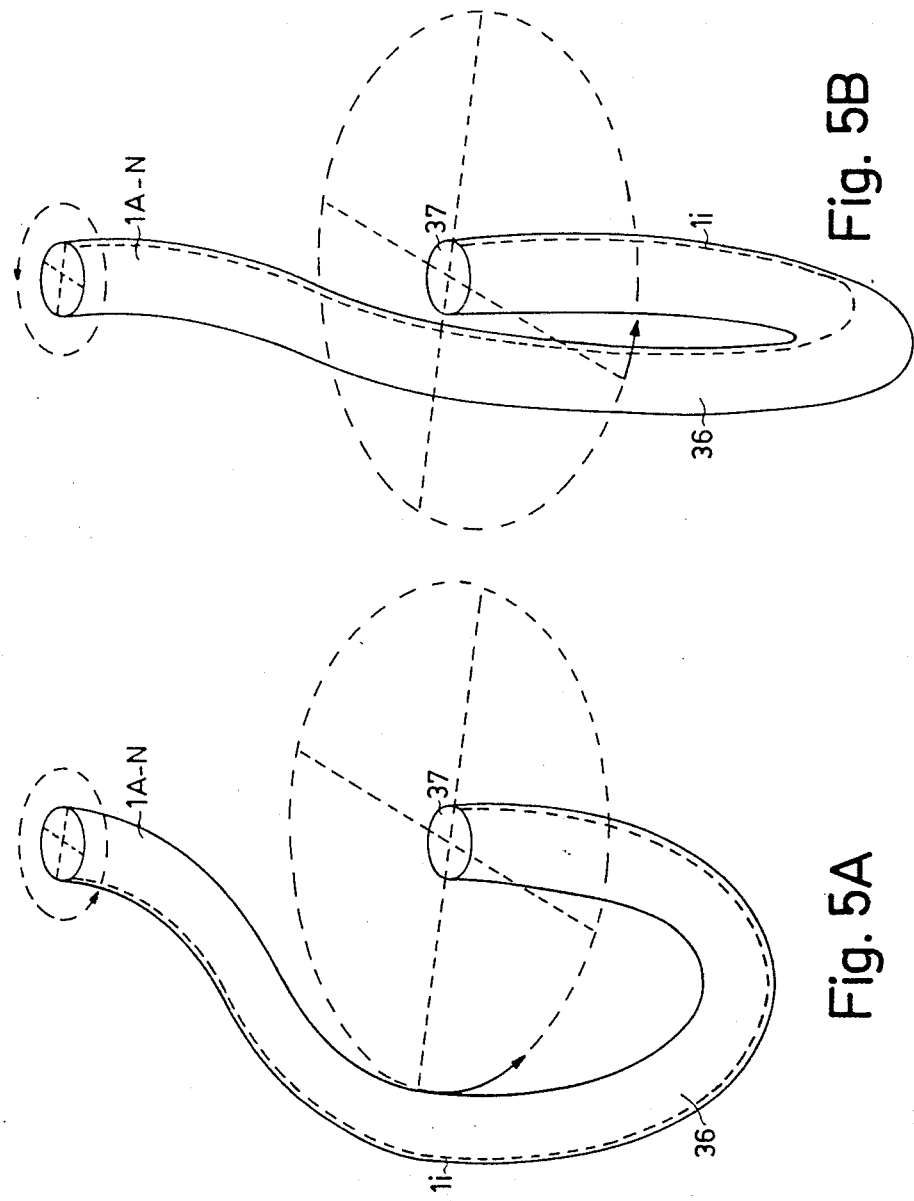
FIGS. 5A and 5B are a part of the fourth embodiment of a rotary optical coupler.

FIGS. 5A and 5B illustrate the first array of optical conductors 1A-N with loop 36 in two positions, where the influence of a change in the position of the array as a whole on the position of one single optical conductor 1$i$ within this array will be examined more closely. In FIG. 5A the top end of optical conductor 1$i$ is on the left-hand side of the array and the conductor runs down along the outside of the array to finish on the right-hand side in going upwards at end 37 of loop 36. In this situation there is no twisting of any optical conductor in the array of conductors 1A-N.

FIG. 5B illustrates the array of optical conductors 1A-N rotated through 180°, where the top end of optical conductor 1$i$ is on the right-hand side of the array. The loop 36 also performed a swivelling motion through half the angle, i.e. 90°. This figure again shows that optical conductor 1$i$, of which the top end is on the right-hand side of the array of conductors 1A-N, retains this position even when passing through loop 36 to end 37. Also in this situation the array of conductors 1A-N is not subject to twisting; such a situation is thus achieved by combining a rotation of the complete array of optical conductors 1A-N at an angular velocity $\omega$ with the swivelling motion of loop 36 at half the angular speed ($\frac{1}{2}\omega$).

For a satisfactory swivelling motion of the loop 36 in FIG. 4 the cylindrical enclosure 33 comprises an insert piece 38, which is rotatable in bearing blocks 39 and 40 with respect to the upper enclosure half 34 and the lower enclosure half 35.

Insert piece 38 includes a feedthrough channel 41. This channel, having an eccentric access at the top side, opens gradually in the radial direction into a chamber 42 at a central position in the insert piece. The array of optical conductors 1A-N passes from the first tube member 6 to chamber 42 via channel 41. In order that insert piece 38 together with the array of conductors 1A-N moves at the desired half angular velocity ($\frac{1}{2}\omega$), insert piece 38 comprises a vertical bore 43, accommodating a shaft 44 that rotates in bearing blocks 45. At the ends of shaft 44 are gear wheels 46 and 47. Gear wheel 46 is in mesh with an internally toothed ring 48 fitted to the inside of the upper enclosure half 34, the gear ratio between gear wheel 46 and ring 48 being 2:1. Gear wheel 47 is in mesh with a gear wheel 49 secured to the end of tube member 7, the gear ratio between these gear wheels also being 2:1. Therefore, with the two tube members 6 and 7 rotating relatively at a rate ω the insert piece will rotate at a rate of a ½ω with respect to each of the two tube members.

The position of end 37 with respect to the second array of optical conductors 2A-N may not change during the rotating motion of loop 36. A transmission element consisting of two gear wheels 50 and 51 is incorporated for rotation by means of bearing blocks 52 about the rotation axis of insert piece 38, while a third gear wheel 53, being in mesh with gear wheel 50, is mounted on shaft 44. Because the gear ratio between gear wheels 50 and 53 is 2:1, the position of the transmission element formed by gear wheels 50 and 51 is not subject to change with respect to the bottom tube member 7. Since end 37 is encapsulated in a support 16 connected with gear wheel 51, the end 37 assumes a fixed orientation with respect to tube member 7.

To obtain a smooth rotation of the array of optical conductors 1A-N within the insert piece 38, gear wheels 54 and 55, rotating in bearing blocks 56 and 57, respectively, are mounted near each of the two ends of feedthrough channel 41 in insert piece 38 and perpendicular to the feedthrough direction of optical conductors 1A-N. The array of optical conductors 1A-N is clamped in the axial bore of each of the gear wheels 54 and 55.

Gear wheels 54 and 55 are in mesh with gear wheels 50 and 51 respectively, the transmission ratio being 1:1. The rotational speed of the array of conductors 1A-N within the feedthrough channel 41 has a speed component which is obtained through the meshing of gear wheels 54 and 55 with gear wheels 50 and 51, respectively, which is equal to the relative angular speed of insert piece 38 with respect to the second tube member 7. A second component for the rotational speed of the first array of optical conductors 1A-N within the insert piece 38 results from the rotating motion of the loop 36 itself, and is also equal to the relative angular speed of the insert piece 38 with respect to the second tube member 7. The addition of the two speed components renders the rotational speed of the array of optical conductors 1A-N relative to the insert piece 38 which is double the relative angular speed of the insert piece 38 with respect to the second tube member 7, therefore providing the relative rotational speed of the first tube member 6 with respect to the second tube member 7 which is required.

The signals passed through optical conductors 1A-N can be processed in chamber 42 (and for instance be converted into electrical signals), or transmitted to the second array of optical conductors 2A-N. In the latter case, optical conductors 1A-N of the first array are spread out fanwise and are bent in the direction of the second array of optical conductors 2A-N; however, the problem here arising is that the path of loop 36 cuts that of optical conductors 1A-N. This problem can be solved by transferring the signals passed through optical conductors 1A-N to the second tray of optical conductors 2A-N by light emission at the plane of motion of loop 36. This requires accurate positioning of optical conductors 2A-N in the light path of the fanwise spread conductors 1A-N, utilising other optical means, such as lens systems, for proper reception of the light signals. Optical conductors 2A-N, spread out as well, are formed into a bundle at the second tube member 7.

The problem remaining is that the light emission will be interrupted for a brief moment when loop 37 crosses the light path between two optical conductors. This causes an interruption in the flow of information. This problem can be solved by passing the same information through several optical conductors and combining related information flows. A similar solution is obtained by transferring the information from one optical conductor of the end of loop 36 to two optical conductors, which are parted and bent in diametrical directions. After the information is transmitted the separate flows can be recombined. Still another solution to the above problem can be obtained by removing the protective coating of the optical conductors of loop 36 at the location where the information flow crosses the plane of motion of loop 36, obviating the disadvantage of interruption in the light emission to a large extent.

FIGS. 6A and 6B illustrate a fifth embodiment of optical slip rings, showing the first array of optical conductors 1A-N and the second array of optical conductors 2A-N uniformly spaced apart in a circular arrangement representing the optical coupler. In this embodiment optical body 4 comprises a rotatable frame 58 and, attached thereto, an array of optical conductor members 59A-N, the number of each part shown in the figure corresponding with the number of optical conductors of each of the arrays 1A-N and 2A-N. The ends of optical conductors 59A-N facing the same side are disposed as in the case of the ends of the adjoining array of optical conductors 1A-N and 2A-N. Optical conductor members 59A-N are secured to frame 58 in such a way that the conductor ends at one end of the frame are disposed in oposite sense to the conductor ends at the other end of the frame. In FIG. 6A information will be transferred by light emission from optical conductor 1A to optical conductor member 59A and subsequently to optical conductor 2B. Similarly, light signals are transferred from optical conductor 1B to optical conductor 2A via conductor member 59B and finally from optical conductor 1N to optical conductor 2C via conductor member 59N.

In FIG. 6B, showing only the ends of optical conductors 1A-N, 2A-N, and conductor members 59A-N, the array of optical conductors, 1A-N is rotated through an angle $4\pi/N$, and frame 58 through half this angle, i.e. $2\pi/N$. The position of the array of conductors 2A-N has remained unchanged however. From FIG. 6B it is seen that light information is transferred from conductor 1A to conductor 2B via conductor member 59B, light information from conductor 1B to conductor 2A via conductor member 59C, and finally information from conductor 1N to conductor 2C via conductor member 59A. In FIGS. 6A and 6B light signals are transferred in such a way that information destined for optical conductor 2A is always transmitted from optical conductor 1B, information for conductor 2B always from optical conductor 1A, information for conductor 2C always from optical conductor 1N, etc. In this way, even with rotation, optical information from a random optical conductor of one array is always transferred to a fixed optical conductor of the other array. The illustration in FIGS. 6A and 6B showing the optical conductors uniformly spaced apart in a circular arrangement was made only to clarify the operation of the rotary optical coupler. In practice, during rotation of the members of the optical coupler, such an arrangement would effect a non-continuous transmission of optical information between the arrays of optical conductors 1A–N and 2A–N. This is prevented by fitting as many optical conductor members to frame 58 as are required to fill up the entire edge of the upper and lower ends of this frame with ends of optical conductor members. These optical conductor members should of course be oriented in the sense as indicated and should minimize fluctuations in the light intensity during rotation when light signals from one array of optical conductors are transmitted to the other via the array of optical conductor members 59A–N. Such fluctuations are minimized by using an arrangement as shown in FIG. 7, where optical information from the first array of optical conductors 1A–N is coupled out by optic means producing a relatively wide beam of optical information. With such a widened beam it is possible to project light signals on several optical conductors of optical body 4 simultaneously. A reverse situation then arises with the transmission of light from optical body 4 to optical conductors 2A–N. It is necessary to eliminate any crosstalk between the optical conductors due to simultaneous light transmission from one optical conductor (member) to two optical conductor members or optical conductors. This can be achieved by making the number of optical conductor members in the optical body n x as large as the number of optical conductors in an array, and by making the light beam of an optical conductor of an array of such a diameter that only k optical conductor members, where $k<n$, can be illuminated simultaneously with the light beam of one optical conductor. In FIG. 7, where $n=6$, k varies between 3 and 5. A similar relationship, but in reverse sense, occurs with the light transmission from optical body 4 to the second array of optical conductors 2A–N.

In the embodiment of a rotary optical coupler, as shown in FIGS. 6A and 6B, the driving means for the rotating motion of optical body 4 can be coupled to the shaft of body 4 or to the periphery of body 4.

The optical conductors in the figures were illustrated schematically only; this could give the impression that these conductors are disposed in a flat plane (FIGS. 1–4) or in a circle (FIGS. 6A and 6B). Actually, in all of the embodiments an array of optical conductors can be so arranged that a uniformly filled cross section of the array is obtained, as shown in FIG. 8.

I claim:

1. A rotary optical coupler comprising:
   a. a reflector forming part of an optically transmissive body which is mounted for rotation around a longitudinal axis of the coupler, said reflector comprising two reflective surfaces disposed on opposite sides of a planar cross-section of the body, said cross-section intersecting said axis;
   b. a first array of optical conductors mounted for rotation relative to the reflector around said axis, each of said conductors being directed toward a point on said reflector at a predefined angle of incidence;
   c. a second corresponding array of optical conductors mounted for rotation relative to the reflector around said axis, each of said conductors being directed toward the same point on said reflector as a respective one of the conductors in the first array and at an angle of reflection corresponding to the angle of incidence for said respective conductor; and
   d. means engaging the first and second arrays to effect equal rotation of said arrays as viewed from the reflector, whereby the optical conductors in the first array are constantly coupled to respective ones of the optical conductors in the second array during rotation of the first and second arrays.

2. A rotary optical coupler as in claim 1 where said body is a sphere.

3. A rotary optical coupler as in claim 1 where said body comprises two cones having a common base, said planar cross-section being coextensive with said base.

4. A rotary optical coupler comprising:
   a. a housing mounted for rotation around a longitudinal axis;
   b. a reflector attached to said housing, said reflector having a reflective surface lying parallel to the longitudinal axis;
   c. a first array of optical conductors mounted for rotation around a first transverse axis intersecting the reflective surface, each of said conductors being directed toward a respective point on said reflective surface at a predefined angle of incidence, said first array being further mounted for precession around the longitudinal axis;
   d. a second corresponding array of optical conductors mounted for rotation around a second transverse axis intersecting the reflective surface, each of said conductors being directed toward the same point on said reflective surface as a respective one of the conductors in the first array and at an angle of reflection corresponding to the angle of incidence for said respective conductor, said second array being further mounted for precession around the longitudinal axis; and
   e. means engaging the first array, the second array and the housing to effect equal rotation of the first and second arrays as viewed from the reflector, and an equal rate of movement of the arrays and the reflector around the longitudinal axis, whereby the optical conductors in the first array are constantly coupled to the respective optical conductors in the second array during said rotation and precession.

5. A rotary optical coupler as in claim 4 where the reflector forms a part of an optical transmissive body.

6. A rotary optical coupler comprising:
   a. a reflector forming part of an optically transmissive body which is mounted for rotation around a longitudinal axis of the coupler, said reflector comprising a reflective surface disposed on one side of a planar cross-section of the body, and parallel to the longitudinal axis;
   b. a first array of optical conductors mounted for rotation relative to the reflector around said axis, each of said conductors being directed toward a point on said reflector at a predefined angle of incidence;
   c. a second corresponding array of optical conductors mounted for rotation relative to the reflector around said axis, each of said conductors being directed toward the same point on said reflector as a respective one of the conductors in the first array and at an angle of reflection corresponding to the angle of incidence for said respective conductor; and d. means engaging the first and second arrays to effect both equal rotation of said arrays as viewed from the reflector and precession around said axis at the same rate as the body rotates around said axis, whereby the optical conductors in the first array are constantly coupled to respective ones of the optical conductors in the second array during rotation of the first and second arrays.

* * * * *